United States Patent

[11] 3,555,292

[72] Inventor Donald E. Henry
Davenport, Iowa

[21] Appl. No. 812,481
[22] Filed Aug. 26, 1968
[45] Patented Jan. 12, 1971
[73] Assignee Gulf + Western Industries
New York, N.Y.
a corporation of Delaware. by mesne assignment

[54] ZERO SWITCHING NETWORK FOR A TRIAC SWITCHING CIRCUIT
7 Claims, 1 Drawing Fig.

[52] U.S. Cl. .......... 307/133, 307/252
[51] Int. Cl. .......... H01h 9/56
[50] Field of Search .......... 307/133, 136, 252X; 323/22SCR; 317/11.1

[56] References Cited

UNITED STATES PATENTS

| | | | |
|---|---|---|---|
| 3,319,152 | 5/1967 | Pinekaers | 323/22SCR |
| 3,335,291 | 8/1967 | Gutzwiller | 307/133UX |
| 3,373,290 | 3/1968 | Baker | 307/133 |
| 3,381,226 | 4/1968 | Jones et al. | 307/133UX |
| 3,401,303 | 9/1968 | Walker | 317/11.1UX |

*Primary Examiner*—Robert K. Schaefer
*Assistant Examiner*—T. B. Joike
*Attorney*—Meyer, Tilberry and Body

ABSTRACT: There is provided a switching circuit for switching an alternating voltage source across a load including switch means, such as a triac, having a first, second, and control electrode, and exhibiting the characteristic of presenting a low impedance to current flow from the voltage source to the load when a forward biasing signal is applied to the control electrode; and circuit means for applying a forward biasing signal to the control electrode. The circuit means includes a transformer having a primary winding, and a secondary winding coupled between the first and control electrode of the switch means, first actuatable switching means for coupling one terminal of the primary winding to a source supply, second actuatable switching means for, upon energization, completing a circuit between the primary winding and the source supply, means for periodically actuating the first actuable switching means, and means for actuating the second switching means when the alternating voltage source is at a predetermined voltage level.

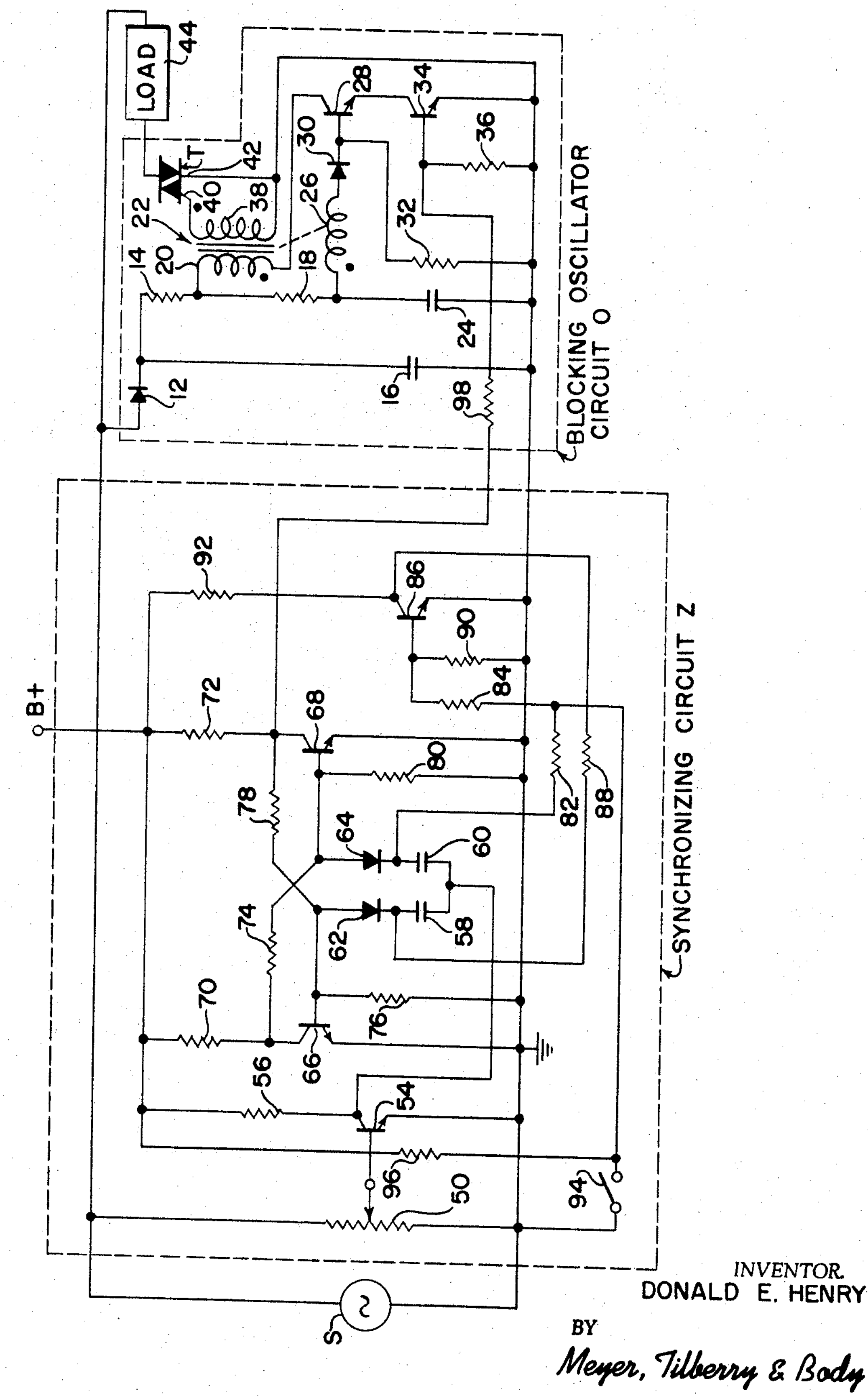
INVENTOR.
DONALD E. HENRY
BY
Meyer, Tilberry & Body
ATTORNEYS

ZERO SWITCHING NETWORK FOR A TRIAC SWITCHING CIRCUIT

DISCLOSURE

The present invention relates to the art of circuits of the type for actuating a switching device, and, more particularly, to such circuits for gating an electronic device into conduction at a predetermined voltage level of an alternating current line voltage.

The present invention is particularly applicable as a control circuit for a triac, and will be described with particular reference thereto, although it will be appreciated that the invention has broader application and may be used with silicon controlled rectifiers or other switching devices.

Solid-state switching devices, which are triggered into conduction by a gating signal, for controlling the voltage applied to a load have become an important component in a wide variety of control applications. One such device is a SCR, particularly to as a silicon controlled rectifier. These devices are limited to use in permitting current conduction in one direction only. Thus, for alternating current applications it is necessary to employ two silicon control rectifiers, poled in reverse directions with the gates of each device separately triggered. More recently, a device known as a triac and described in application Note 200.35, Mar. 1966 by General Electric Company has been employed for controlling alternating current. The triac, a generic term that has been given a three-electrode AC semiconductor switch.

One problem encountered in switching a load, particularly an inductive load, across and alternating current voltage source with a device such as a triac, is that the transient voltage developed when the voltage is switched frequently exceeds the maximum voltage limitation of the device. Further, in operating a series of loads, such as electric motors, from a common supply, the initial starting current consumed by the loads when energized simultaneously, frequently exceeds the maximum current limitation of the supply.

The present invention contemplates a new and improved control circuit which overcomes all of the above referred-to problems, and others, and provides a control circuit which is simple in construction.

In accordance with the present invention there is provided a switching circuit for switching an alternating voltage supply source across a load comprising; switch means having a first, second, and control electrode, and exhibiting the characteristic of presenting a low impedance to current flow from the voltage source to a load when a forward biasing signal is applied to the control electrode; and circuit means for applying a forward biasing signal to the control electrode. The circuit means includes a transformer having a primary winding, and a secondary winding coupled between the first and control electrode, first actuatable switching means for coupling one terminal of the primary winding to a source supply, and second actuatable switching means for completing a circuit between the primary winding and the source supply. The first actuatable switching means is actuated periodically at a given frequency, and the second actuatable switching means monitors the alternating voltage and is actuated only when the alternating voltage attains a predetermined voltage level.

In accordance with another aspect of the present invention there is provided a synchronizing network for providing an output signal when the voltage developed by an alternating voltage supply source attains a preselected voltage level, comprising a switch means; a first electronic control device having an input circuit adapted to be connected across the alternating voltage source, and an output circuit; a second electronic control device having an input circuit connected to the switch means and an output circuit; and a bistable circuit having a first condition and a second condition, and a first and second actuatable switching means, wherein the output circuit of the first control device is connected to the first and second actuatable switching means, the output circuit of the second control device is connected to the first actuatable switching means, and the switch means is connected to the second actuatable switching means. Upon closure of the switch means the bistable circuit will change from the first condition to the second condition when the alternating voltage attains a predetermined voltage level.

The principle object of the present invention is to provide a circuit for actuating a switching device at a time when the alternating current supply source is at approximately zero-voltage level.

Another object of the present invention is to provide a switching circuit for applying an alternating current voltage source to a load wherein switching is synchronized with the alternating voltage developed by the alternating current supply source.

Another object of the present invention is to provide a semiconductor switching circuit which is capable of operation at relatively high temperatures, i.e., in excess of 100°C.

A still further object of the present invention is to provide a control circuit for a switching device in which the gating signal takes the form of a very short time duration pulse and is applied to the device at a time when the alternating current line voltage is at approximately a zero voltage level.

A still further object of the present invention is to provide a circuit for actuating a switching device at a predetermined time after commencement of a voltage cycle of an alternating current supply source.

A further object of the present invention is to provide an improved circuit for controlling a triac.

These and other objects and advantages of the invention will become apparent from the following description of the preferred embodiment of the invention as read in connection with the accompanying drawing in which:

The FIG. is a schematic circuit diagram illustrating a control circuit for a triac in accordance with the preferred embodiment of the present invention.

Referring now to the drawing wherein the showings are for purposes of illustrating a preferred embodiment of the invention and not for purposes of limiting same, the FIG. illustrates a control circuit for a triac, and generally comprises a load 44 connected to the output of a triac having its input connected through a blocking oscillator circuit O and synchronizing network Z to an alternating current voltage source S.

BLOCKING OSCILLATOR

Blocking oscillator circuit O, as is more particularly described in U.S. Pat. application, Ser. No. 730,212, filed Apr. 16, 1968, and entitled "High Temperature Semiconductor Switching Circuit", includes a diode 12, having its anode connected to one terminal of the alternating current voltage source S, and its cathode connected to the junction point between a resistor 14 and one terminal of a capacitor 16. The other terminal of capacitor 16 is connected directly to ground, and the other terminal of resistor 14 is connected to the junction point between a resistor 18 and one terminal of the primary winding 20 of a transformer 22. Connected to the other terminal of resistor 18 is the junction point of a capacitor 24 and the positive polarity indicated end of a feedback winding 26 of transformer 22. The other terminal of capacitor 24 is connected directly to ground, and the other terminal, or the positive polarity indicated end, of primary winding 20 is connected to the collector of a NPN transistor 28. Connected to the other terminal of feedback winding 26 is the anode of a diode 30, and the cathode thereof is connected to the base of transistor 28. Connected to the junction point between diode 30 and the base terminal of transistor 28 is a resistor 32, which is in turn connected to ground, The base of transistor 34 is connected through a resistor 36 to ground, and the emitter of this transistor is connected directly to ground. The positive polarity indicated end of a secondary winding 38 of transformer 22 is connected to a control electrode 40 of triac T, and the other terminal of secondary winding 38 is connected directly to a terminal 42 of the triac T. Terminal 42 of triac T is connected directly to ground, and the other terminal of the triac is connected through a load 44 directly to the alternating current source supply S. Load 44 may take the form of any suitable alternating current load, such as a motor for actuating a hydraulic solenoid.

SYNCHRONIZING NETWORK

Synchronizing network Z includes a voltage divider comprised of a potentiometer 50 connected across alternating current source supply S. Resistor 50 preferably is a potentiometer, but may be a pair of fixed resistors of a value to set a desired voltage level at which the network is responsive. The adjustable arm of potentiometer 50 is connected to the base of a NPN transistor 54, and the other terminal of resistor 52 is connected directly to ground. The collector of transistor 54 is connected through a resistor 56 to a B+ supply source, and the emitter of transistor 54 is connected directly to ground. Also connected to the collector of transistor 54 are a pair of capacitors 58 and 60. The other terminals of capacitors 58 and 60 are connected through a pair of diodes 62 and 64 poled as shown in the FIG., respectively, to the base terminals of a pair of NPN transistors 66 and 68, respectively. The emitters of transistors 66 and 68 are connected in common to ground, and the collectors of these transistors are connected through a pair of resistors 70 and 72, respectively, to the B+ supply source. The collector of transistor 66 is also connected through a resistor 74 to the base of transistor 68, and the base of transistor 66 is connected through a resistor 76 directly to ground. Similarly, the collector of transistor 68 is connected through a resistor 78 to the base of transistor 66, and the base of transistor 68 is connected through a resistor 80 directly to ground.

The junction point between capacitor 60 and diode 64 is connected through a pair of series-connected resistors 82 and 84 to the base of a NPN transistor 86. The collector of transistor 86 is connected through a resistor 88 to the junction between capacitor 58 and diode 62. The base of transistor 86 is connected through a resistor 90 directly to ground, and the emitter of this transistor is connected directly to ground. Connected between the collector of transistor 86 and the B+ supply source is a resistor 92. The junction between resistor 82 and resistor 84 is connected through a normally open switch 94 to ground, and is also through a resistor 96 to the B+ supply source. The collector of transistor 68 is connected through a resistor 98 to the base of transistor 34 to actuate the latter transistor.

OPERATION OF THE SYNCHRONIZING NETWORK

The operation of the preferred embodiment will now be described with reference to the FIG. Alternating current source S is connected through the voltage divider comprised of potentiometer 50 to the base terminal of transistor 54, thereby biasing this transistor into conduction on the positive polarity portion of the alternating current signal. The output signal of transistor 54, takes the form of a binary "0" signal when transistor 54 is biased into conduction, i.e., during the positive polarity portion of the alternating current signal, and a binary "1" signal when the transistor is reverse biased, i.e., during the negative polarity portion of the alternating current signal. By a binary "0" signal is meant a signal equal to approximately ground potential, or a slightly negative voltage, and by a binary "1" signal is meant a signal of some positive value.

The signal applied to the base of transistor 86, and to the junction between capacitor 60 and diode 64, takes the form of a binary "1" signal prior to closure of switch 94. The signal appearing at the collector of transistor 86 is the signal applied to the junction between capacitor 58 and diode 62 and takes the form of a binary "0" signal prior to closure of switch 94 since this transistor is normally forward biased.

Upon closure of normally open switch 94, transistor 86 is reverse biased thereby applying a binary "1" signal to the junction between capacitor 58 and diode 62. A binary "0" signal will be applied to the junction between capacitor 60 and diode 64 when switch 94 is closed.

The circuit including transistors 66 and 68 operates in a manner similar to a bistable multivibrator, with the exception of the trigger signal. Thus, when a binary "1" signal is applied to the base of transistor 66, this transistor will begin conducting and thereby apply a binary "0" signal to the base of transistor 68. Upon application of a binary "0" signal to the base of transistor 68, the transistor will become reverse biased, to thereby apply an increasing binary "1" signal to the base of transistor 66. As is well known, through this regenerative action transistor 66 will become saturated and turn "on" completely, and transistor 68 will turn "off" completely. Similarly, if a binary "1" signal is applied to the base of transistor 68, through the converse of the above-indicated regenerative action, transistor 68 will be forward biased into conduction and transistor 66 will become reverse biased to thereby turn "off".

When switch 94 is open, a binary "1" signal is applied to the junction between capacitor 60 and diode 64, and to the base of transistor 86 to thereby forward bias this transistor. When transistor 86 becomes forward biased, a binary "0" signal will be applied to the junction between capacitor 58 and diode 62. As the voltage developed by voltage source S becomes negative, transistor 54 will become reverse biased to thereby apply a binary "1" signal to the junction between capacitors 58 and 60. Since a binary "1" signal is applied to one terminal of capacitor 58 and a binary "0" signal is applied to the other terminal, this capacitor charges to approximately a voltage equal to the voltage of the B+ supply source. The upper terminal of capacitor 58 will be a negative voltage with respect to the lower terminal. Since a binary "1" signal is applied to both terminals of capacitor 60, this capacitor will discharge. As the voltage developed by voltage source S becomes positive, transistor 54 will become forward biased to thereby apply a binary "0" signal to the junction between capacitors 58 and 60. Upon application of a binary "0" signal to the lower terminal of capacitor 58, the charge stored by this capacitor will cause a negative signal to be applied to the base of transistor 66 to thereby reverse bias this transistor through diode 62. When transistor 66 is reverse biased, the bistable multivibrator will be actuated into a condition in which transistor 66 is nonconductive, and transistor 68 is conductive. In this condition, the signal applied to the blocking oscillator circuit O is a binary ""0"signal.

When switch 94 is closed, a binary "0" signal is applied to the junction between capacitor 60 and diode 64, and to the base of transistor 86 to thereby reverse bias this transistor. When transistor 86 is reverse biased, a binary "1" signal will be applied to the junction between capacitor 58 and diode 62. As the signal developed by voltage source S becomes a negative voltage, transistor 54 will become reverse biased to thereby apply a binary "1" signal to the junction between capacitors 58 and 60. Since a binary "0" signal is applied to one terminal of capacitor 60 and a binary "1" signal is applied to the other terminal, capacitor 60 will charge to a voltage approximately equal to the B+ supply source. Similar to capacitor 58, capacitor 60 will charge such that the upper terminal will be a negative voltage with respect to the lower terminal. Capacitor 58, having a binary "0" signal applied to both terminals, will discharge. As voltage source S begins to develop a positive signal, transistor 54 will become forward biased to thereby apply a binary "0" signal to the junction between capacitors 58 and 60. When a binary "0" signal is applied to the lower terminal of capacitor 60, the stored charge across the capacitor will cause a negative voltage to be applied to the base terminal of transistor 68 to thereby reverse bias this transistor. Upon reverse biasing transistor 68, a binary "1" signal will be applied to blocking oscillator circuit O to thereby forward bias transistor 34 into conduction.

OPERATION OF BLOCKING OSCILLATOR CIRCUIT

Blocking oscillator circuit O is made operative once transistor 34 is gated into conduction by synchronizing circuit Z. This places the emitter of transistor 28 at substantially ground potential so as to pass current once this transistor is forward biased. Diode 12 serves as a rectifier to charge capacitor 16 during the positive half cycle of alternating current voltage source S. Capacitor 16, in turn, serves as a direct current voltage source for oscillator O. Resistor 14 serves as a current limiting resistor to reduce the voltage applied to the oscillator circuit. As current passes through resistors 14 and 18, winding 26, diode 30 and resistor 32, a forward biasing potential is applied to the base of transistor 28. Since transistor 34 has been gated into conduction by circuit Z, current will now flow from diode 12, through resistor 14, winding 20, the collector to emitter electrodes of transistor 28, and through the collector to emitter electrodes of transistor 34. As current flows through winding 20 a forward biasing potential is reflected reflected onto the base of transistor 28 through winding 26. As this is a regenerative type oscillating circuit, the more current that passes through winding 20 the greater will be the forward biasing potential applied to the base of transistor 28 from winding 20. This regenerative action continues until the core of transformer 22 saturates, at which time any further increase incurrent flowing through winding 20 will not increase the forward bias applied to the base of transistor 28. As this happens, the oscillator circuit will begin to collapse, because there will appear to be a reverse bias potential applied by winding 26 to the base of transistor 28. This, in turn, reduces the amount of current flowing in winding 20 in increase the reverse biasing potential applied to the base of transistor 28. This operation of increasing and decreasing the amount of current flowing through winding 20 continues at a frequency dictated by the core material of the transformer 22. During this oscillating operation, capacitor 24 serves as a filter connected to resistor 18 and winding 26 to hold a bias level voltage for transistor 28. The output of the transformer is taken from winding 38 which applied positive and negative going a gating pulses at the oscillator frequency to the gate 40 of triac T.

Thus, transistor 34 is switched into, and out of, conduction by the signal applied from synchronizing network Z. For example, upon closure of normally open switch 94, and upon commencement of a positive polarity signal from alternating voltage source S, transistor 68 will be reverse biased to thereby apply a binary "1" signal to the base of transistor 34. This binary "1" signal forward biases transistor 34 to thereby commence operation of the oscillator circuit. When the oscillator circuit commences, a gating signal will be applied to triac T to thereby energize load 44.

In accordance with the preferred embodiment of the invention, the values and types of various components illustrated in the FIG. are found in table 1:

TABLE I

| Component: | | Component value or type |
|---|---|---|
| NPN transistors 54, 66, 68, 86, 34 | | 2N3567 |
| NPN transistor 28 | | 40327 |
| Diode 12 | | IN4005 |
| Diode 30 | | IN457A |
| B+ Supply Source | volts | [1] +12 |
| Alternating current source S | do | [2] 120 |
| Resistors 52, 76, 80, 90 | kilohms | 220 |
| Resistors 14, 82, 84, 88, 98 | do | 15 |
| Resistors 56, 70, 72, 92, 96 | do | 2.2 |
| Resistors 18, 36 | do | 35 |
| Resistor 32 | do | 3.9 |
| Resistor 50 | do | 100 |
| Transformer winding 20 | turns | 150 |
| Transformer winding 38 | do | 12 |
| Transformer winding 26 | do | 30 |
| Capacitors 58, 60, 24 | microfarad | .01 |
| Capacitor 16 | do | [3] 10 |

[1] Direct current.
[2] Alternating current.
[3] 200 volts.

Although the invention has been shown in connection with a preferred embodiment, it will be readily apparent to those skilled in the art that various changes in form, such as replacement of NPN transistor 54 with a PNP transistor in order to provide synchronization with a negative polarity portion of the alternating voltage developed by alternating voltage source S, may be made without departing from the spirit and scope of the invention as defined by the appended claims.

I claim:

1. A switching circuit for switching an alternating voltage source across a load comprising:
- switch means having a first, second, and control electrode, said switch means exhibiting the characteristic of presenting a low impedance to current flow from said voltage source to said load when a forward biasing signal is applied to said control electrode;
- circuit means for applying a forward biasing signal to said control electrode including:
  - a transformer having a primary and a secondary winding, said secondary winding connected between said first and said control electrodes;
  - first and second actuatable switching means for, when both are actuated, completing a circuit between said primary winding and a power supply source for energizing said primary winding;
  - means for periodically and at a given frequency, actuating said first actuatable switching means; and
  - means for monitoring the voltage developed by said alternating voltage source and actuating said second switching means when said alternating voltage attains a predetermined voltage level.

2. A switching circuit as defined in claim 1 wherein said monitoring means includes a second switch means; and a bistable circuit means having a first and a second condition, an input circuit means, and an output circuit connected to said second actuatable switching means, said input circuit means of said bistable circuit being coupled to said second switch means and said alternating source so that upon closure of said second switch means said bistable circuit will change from said first condition to said second condition when said alternating voltage passes through said predetermined voltage level.

3. A switching circuit as defined in claim 2 wherein said bistable circuit means includes a first and a second electronic control means each having an input circuit means and an output circuit, said output circuit of each control means being coupled to the input circuit means of the other control means so that upon actuation of either of said control means the other of said control means is thereby actuated; said input circuit means of said first and said second control means being coupled in common to said alternating voltage source, and said input circuit means of said first and second control means being coupled to said second switch means.

4. A switching circuit as defined in claim 3 including a variable circuit means coupled between said first and said second control means, and said alternating voltage source for altering said predetermined voltage level at which said bistable circuit means is actuated from said first to said second condition.

5. In a load switching circuit having a triac for switching an alternating voltage source across a load, a voltage synchronizing network for providing an output signal for gating a said triac into conduction when the voltage developed by said alternating voltage source is at a predetermined voltage level comprising:
- switch means for actuating said synchronizing network;
- a first electronic control means having an input circuit adapted to be coupled to said alternating voltage source, and an output circuit;
- a second electronic control means having an input circuit coupled to said switch means, and an output circuit;

a bistable circuit means having a first and a second condition, and a first and a second actuatable switching means; and said output circuit of said first control means being coupled to said first and said second actuatable switching means, said output circuit of said second control means being coupled to said first actuatable switching means, and said switch means being coupled to said second actuatable switching means so that upon closure of said switch means said bistable circuit will change from said first condition to said second condition when the voltage developed by said alternating voltage source passes through a predetermined voltage level.

6. In a triac switching circuit for switching an alternative alternating voltage source across a load, a voltage synchronizing network for providing an output signal when the voltage developed by said alternating voltage source is at a predetermined voltage level comprising:

switch means for actuating said synchronizing network;

a bistable multivibrator having a first and a second input circuit and an output circuit, a said multivibrator having a first and a second condition;

a first electronic control means having an input circuit adapted to be coupled to said alternating voltage source, an output circuit;

a second electronic control means having an input circuit coupled to said switch means, and an output circuit; and said output circuit of said first control means being connected to said first and second input circuits of said bistable multivibrator, said output circuit of said second control means being connected to said second input circuit of said bistable multivibrator, and said switch means connected to said first input circuit of said bistable multivibrator so that upon closure of said switch means said bistable circuit will change from said first condition to said second condition when the voltage developed by said alternating voltage source passes through a predetermined voltage level.

7. A network as defined in claim 6 wherein said first electronic control means is coupled to a variable circuit means for altering said predetermined voltage at which said bistable multivibrator is actuated from said first to said second condition.